(12) United States Patent
Gao et al.

(10) Patent No.: US 12,377,845 B2
(45) Date of Patent: Aug. 5, 2025

(54) ADAPTIVE PATH FOLLOWING ALGORITHM FOR HEAVY-DUTY VEHICLES

(71) Applicant: Volvo Truck Corporation, Gothenburg (SE)

(72) Inventors: Yangyan Gao, Gothenburg (SE); Timothy Gordon, Lincoln (GB); Shammi Rahman, Lincoln (GB); Leon Henderson, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 81 days.

(21) Appl. No.: 18/561,358

(22) PCT Filed: May 23, 2022

(86) PCT No.: PCT/EP2022/063880
§ 371 (c)(1),
(2) Date: Nov. 16, 2023

(87) PCT Pub. No.: WO2022/248399
PCT Pub. Date: Dec. 1, 2022

(65) Prior Publication Data
US 2024/0227793 A1    Jul. 11, 2024

(30) Foreign Application Priority Data

May 25, 2021   (WO) ................. PCT/EP2021/063818

(51) Int. Cl.
*B60W 30/00*    (2006.01)
*B60W 30/045*   (2012.01)
*B60W 30/12*    (2020.01)

(52) U.S. Cl.
CPC .......... *B60W 30/12* (2013.01); *B60W 30/045* (2013.01); *B60W 2300/125* (2013.01);
(Continued)

(58) Field of Classification Search
CPC ............... B60W 30/12; B60W 30/045; B60W 2300/125; B60W 2510/20;
(Continued)

(56) References Cited

U.S. PATENT DOCUMENTS

| | | | |
|---|---|---|---|
| 2012/0283911 A1* | 11/2012 | Lee | ........................ B60W 30/12 |
| | | | 701/41 |
| 2014/0180543 A1 | 6/2014 | Ueda et al. | |

(Continued)

FOREIGN PATENT DOCUMENTS

| | | |
|---|---|---|
| CN | 102358287 A | 2/2012 |
| CN | 104960520 A | 10/2015 |

(Continued)

OTHER PUBLICATIONS

International Search Report and Written Opinion for International Patent Application No. PCT/EP2021/063818, mailed Feb. 9, 2022, 13 pages.

(Continued)

*Primary Examiner* — Shardul D Patel
(74) *Attorney, Agent, or Firm* — Withrow & Terranova, PLLC

(57) ABSTRACT

A method for controlling a heavy-duty vehicle to follow a reference path (P), comprising determining a goal point along the reference path to be used as a steering reference from a vehicle location in vicinity of the path, where the goal point is distanced along the path by a preview distance measured from a reference location associated with the vehicle location, determining a direction $w_1$ of a first flow field associated with the reference path, determining whether a lateral deviation of the vehicle location from the reference path exceeds a threshold lateral deviation, and controlling the vehicle in accordance with the direction $w_1$ of a first flow field if the lateral deviation exceeds the (Continued)

threshold lateral deviation, and otherwise controlling the vehicle in accordance with the direction $w_{pipe}$ of a pipe flow substantially parallel to the reference path or in accordance with an optimization-based path.

18 Claims, 11 Drawing Sheets

(52) U.S. Cl.
CPC ... *B60W 2510/20* (2013.01); *B60W 2520/125* (2013.01); *B60W 2552/30* (2020.02)

(58) Field of Classification Search
CPC ....... B60W 2520/125; B60W 2552/30; B60W 60/001; B60W 2520/10; B60W 30/10; B60W 30/00; G08G 1/167; B62D 15/025; B60Y 2300/10
USPC .......................................................... 701/22
See application file for complete search history.

(56) References Cited

U.S. PATENT DOCUMENTS

| | | | |
|---|---|---|---|
| 2015/0057835 | A1 | 2/2015 | Streubel |
| 2015/0225017 | A1* | 8/2015 | Takeda ................ B62D 6/008 701/41 |
| 2019/0361449 | A1 | 11/2019 | Ueno et al. |
| 2019/0375450 | A1 | 12/2019 | Medagoda et al. |
| 2020/0149898 | A1 | 5/2020 | Felip Leon et al. |
| 2020/0298859 | A1* | 9/2020 | Ozay .................... G08G 1/167 |
| 2021/0041882 | A1 | 2/2021 | Lacaze et al. |
| 2021/0097786 | A1 | 4/2021 | LaBarbera et al. |
| 2024/0227794 | A1 | 7/2024 | Gao et al. |
| 2025/0065894 | A1 | 2/2025 | Luo et al. |

FOREIGN PATENT DOCUMENTS

| | | |
|---|---|---|
| CN | 107264621 A | 10/2017 |
| CN | 109407674 A | 3/2019 |
| CN | 110789530 A | 2/2020 |
| CN | 110850878 A | 2/2020 |
| CN | 111674393 A | 9/2020 |
| CN | 111674403 A | 9/2020 |
| CN | 111806437 A | 10/2020 |
| CN | 112000090 A | 11/2020 |
| DE | 102008043675 A1 | 5/2010 |
| EP | 1847442 A2 | 10/2007 |
| EP | 1847442 A3 | 9/2009 |
| EP | 2251238 A1 | 11/2010 |
| EP | 2644477 A1 | 10/2013 |
| EP | 2905204 A1 | 8/2015 |
| WO | 2016130719 A2 | 8/2016 |
| WO | 2016130719 A3 | 9/2016 |
| WO | 2018089898 A2 | 5/2018 |
| WO | 2018089898 A3 | 6/2019 |
| WO | 2019184179 A1 | 10/2019 |

OTHER PUBLICATIONS

International Search Report and Written Opinion for International Patent Application No. PCT/EP2022/063880, mailed Oct. 11, 2022, 14 pages.
International Search Report and Written Opinion for International Patent Application No. PCT/EP2022/062481, mailed Oct. 20, 2022, 18 pages.
International Preliminary Report on Patentability for International Patent Application No. PCT/EP2022/062481, mailed Dec. 5, 2022, 6 pages.
Coulter, R.C., "Implementation of the Pure Pursuit Path Tracking Algorithm," The Robotics Institute, Carnegie Mellon University, Pittsburgh, Pennsylvania, Jan. 1992, 15 pages.
Gordon, T.J. et al., "Automated Driver Based on Convergent Vector Fields," Proceedings of the Institution of Mechanical Engineers, Part D: Journal of Automobile Engineering, vol. 216, Issue 4, Apr. 2002, pp. 329-347.
Park, M.-W. et al., "Development of Lateral Control System for Autonomous Vehicle Based on Adaptive Pure Pursuit Algorithm," 2014 14th International Conference on Control, Automation and Systems (ICCAS 2014), Oct. 22-25, 2014, Gyeonggi-do, Korea, IEEE, 5 pages.
Semsar-Kazerooni, E. et al. "Multi-objective platoon maneuvering using artificial potential fields," IFAC PapersOnLine, vol. 50, Issue 1, Jul. 2017, Elsevier Ltd., 6 pages.
Song, M. et al., "Flow-field guided steering control for rigid autonomous ground vehicles in low-speed manoeuvring," Vehicle System Dynamics, vol. 57, No. 8, Sep. 2018, pp. 1090-1107.

\* cited by examiner

ADAPTIVE PATH FOLLOWING ALGORITHM FOR HEAVY-DUTY VEHICLES

This application is a 35 USC 371 national phase filing of International Application No. PCT/EP2022/063880, filed May 23, 2022, which in turn claims priority to International Patent Application No. PCT/EP2021/063818, filed May 25, 2021, the disclosures of which are incorporated herein by reference in their entireties.

TECHNICAL FIELD

The present disclosure relates primarily to heavy-duty vehicles, such as trucks and semi-trailer vehicles, although the techniques disclosed herein can also be used in other types of vehicles. The disclosure relates in particular to path following methods for use in vehicle control which are based on a preview distance or lookahead distance.

BACKGROUND

Advanced driver assistance systems (ADAS) and methods for controlling autonomous drive (AD) by autonomous vehicles normally base vehicle control on some form of path following algorithm. The control system first determines a desired path to be followed by the vehicle, e.g., based on a current transport mission, together with map data indicating possible routes to take in order to navigate the vehicle from one location to another.

Path following is the process concerned with how to determine vehicle speed and steering at each instant of time for the vehicle to adhere to a certain reference path to be followed. There are many different types of path following algorithms available in the literature, each associated with its respective advantages and disadvantages.

Pure pursuit is a well-known path following algorithm which can be implemented with relatively low complexity, it is described, e.g., in "Implementation of the pure pursuit path tracking algorithm", by R. C. Coulter, Carnegie-Mellon University, Pittsburgh PA Robotics INST, 1992. The algorithm computes a set of vehicle controls, comprising steering angle, by which the vehicle moves from its current position towards a point at a predetermined "preview" distance away along the path to be followed. The pure pursuit methods cause the vehicle to "chase" a point along the path separated from the vehicle by the preview distance, hence the name.

Vector field guidance is another path following algorithm which instead bases the vehicle control on a vector field, which vector field is also determined based on a preview distance or look-a-head parameter. Vector field guidance methods were, e.g., discussed by Gordon, Best and Dixon in "An Automated Driver Based on Convergent Vector Fields", Proc. Inst. Mech. Eng. Part D, vol. 216, pp 329-347, 2002.

The existing challenges for controlling the motion of a long vehicle combination is path tracking accuracy and stability, therefore most of the autonomous driving application is limited to low speeds. For higher speeds, longer combination vehicles are intrinsically more prone to lateral instability and rollover problems. The well-known pure pursuit path follower often uses gain scheduling to handle various vehicle speeds and road curvatures, where the selection of the gains is not an easy task and cannot be inherited to other vehicle combinations. Other model-based motion planning and control methods need to incorporate an internal vehicle model, which in itself introduces model inaccuracy and computational cost; for multi-unit vehicles, such cost can lead to performance degradation. It is common to the available approaches that they aim to follow a pre-planned path, ignoring available lateral maneuvering room associated with lane width and proximity to traffic and obstacles.

SUMMARY

It is an object of the present disclosure to provide methods and control units for controlling a heavy-duty vehicle during a path following operation such that the control unit will improve vehicle path tracking and lateral stability by including tolerance margins. It is a further object to relax the control objective so as to benefit from available lateral maneuvering room, thereby reducing peak lateral accelerations and lateral jerk. It is a further object for the method to be able to operate in real-time onboard the vehicle, i.e., to manage a challenging limitation on computational time. It is a further object for the control unit to handle a wide range of speeds and road curvatures without switching between gains and/or controllers. It is a further object to propose a control-unit design that is independent of vehicle models; this will eliminate problems that might arise from assumptions made in vehicle modeling (e.g. small angle assumptions in linear vehicle models). It is a still further object to provide an easily scalable control unit, to be able to accommodate a lower or higher number of axles and/or vehicle units of a vehicle combination.

At least some of these objects are achieved by the invention as defined by the independent claims.

There is provided a method for controlling a heavy-duty vehicle to follow a reference path. The method comprises obtaining the reference path to be followed by the vehicle; determining a goal point along the path to be used as a steering reference from a vehicle location in vicinity of the path, where the goal point is distanced along the path by a preview distance measured from a reference location associated with the vehicle location: determining, on the basis of the goal point, a direction $w_1$ of a first flow field associated with the reference path; determining whether a lateral deviation y of the vehicle location from the reference path exceeds a threshold lateral deviation $y_{max}$; and controlling the vehicle in accordance with the direction $w_1$ of a first flow field if the lateral deviation exceeds the threshold lateral deviation, and otherwise controlling the vehicle in accordance with the direction $w_{pipe}$ of a pipe flow substantially parallel to the reference path or in accordance with an optimization-based path.

Accordingly, using knowledge of the vehicle and the prescribed road boundaries, a reference path is defined, and then expanded to form a conceptual 'pipe' (or boundary region) which surrounds the reference path. Mathematically, the pipe corresponds to $y \leq y_{max}$, where y is the unsigned lateral deviation. The expanding of the reference path enables the use of available lateral maneuvering room (path tracking tolerance) while maintaining acceptable clearance with lane boundaries or obstacles. The reference path can be defined simply—e.g., as the centerline of a chosen road lane—while adaptation or optimization is available to benefit vehicle motion within the pipe. AFG (flow guidance) is applied to (a) capture the tracking points defined on the vehicle into the pipe, or (b) smoothen or otherwise optimize motion within the pipe, or both. This simplifies the guidance problem, and reduces lateral control demands (e.g. jerk, peak acceleration amplitude and control bandwidth) while maintaining acceptable lateral displacements. Computational demands are low, and the method is equally applicable to light vehicles, rigid trucks, standard combination vehicles and longer combination heavy vehicles.

According to aspects, the method also comprises determining the preview distance at least partly based on a longitudinal velocity of the vehicle, such that the preview distance increases with an increasing longitudinal velocity. This additional dependence to velocity further improves the path following behavior by the vehicle.

According to aspects, the method further comprises determining the preview distance also based on a first tuning parameter, wherein a control effort for controlling the vehicle to follow the path increases with an increase in the first tuning parameter. This tuning parameter can be used to customize vehicle behavior. The vehicle path following behavior can also be fine-tuned for different vehicle types. Also, the path following behavior can be adjusted in dependence of, e.g., vehicle load. The first tuning parameter can, for instance, also be adjusted in dependence of a curvature of the reference path. This way vehicle path following in curves can be adjusted for an improved path following behavior.

The disclosed method may further comprise determining a centripetal lateral acceleration component associated with the reference path at the reference location and adjusting the first tuning parameter based on the centripetal lateral acceleration component. By adapting the first tuning parameter a according to an equation of the form a=f($\kappa$), where $\kappa$ is any measure of curvature of the reference path, and f($\kappa$) can be an increasing function, an increased control effort is advantageously applied to path-following whenever greater precision is required.

A preview distance can for example be determined as $$D_p = \frac{Uy}{\sqrt{2ay+b}}$$

where U is the longitudinal velocity of the vehicle, y is the lateral deviation, a is the first tuning parameter, and b is a second tuning parameter. The second tuning parameter can be an arbitrary real number of a non-negative real number. It is recalled that y is an unsigned and thus a non-negative quantity (magnitude). This relatively simple expression can be evaluated with limited computational effort in real-time, which is an advantage. Further advantages may be obtained by limiting the preview distance to a minimum preview distance $L_0$, for instance in accordance with the expression $$D_p = \max\left(\frac{Uy}{\sqrt{2ay+b}}, L_0\right)$$

where again U is the longitudinal velocity of the vehicle, y is the lateral deviation, a is the first tuning parameter, b≥0 is a second tuning parameter, and $L_0$ is the minimum preview distance. Parameter b is an adjustment parameter which can be used to modify the behavior close to the reference path. Of course, other expressions $f_0(\cdot)$ involving one or more parameters can also be used for determining the preview distance, as $$D_p = \max(f_0(\cdot), L_0).$$

The methods disclosed herein may advantageously be combined with vector field path following methods, of which artificial flow guidance methods represent a sub-set. For a straight reference path, the vector field points directly at the goal point (or preview point). More generally, on curves, the direction of the first flow field can optionally be determined as $$w_1 = t_3 + \frac{t_1 - t_2}{2\cos\theta}$$

where $t_1$ is a unit-length tangent vector to the reference path evaluated at the reference location, $t_2$ is a unit-length tangent vector to the reference path evaluated at the goal point, $t_3$ is a unit-length vector directed from the vehicle location towards the goal point, and angle $\theta$ is half the angle between the two tangent vectors $t_1$ and $t_2$. This improves vehicle control when cornering. In later sections of the present disclosure, the expression $w_1$ will be referred to as the first flow field. Preferably, for the purpose of computing the vectors $t_2$ and $t_3$, the goal point is determined in accordance with a preview distance ($D_p$) which has been computed without enforcing any minimum preview distance $L_0$.

The methods disclosed herein are advantageously combined with, e.g., a pure pursuit-based path following algorithm, where the reference location equals the vehicle location, or a vector field guidance-based path following algorithm, where the reference location is a location on the path intersected by a straight line orthogonal to the path at the reference location through the vehicle location. The herein disclosed path following methods may also be advantageously used in vehicle applications comprising a Lane Keep Assistance (LKA) function, semi-autonomous drive, and/or autonomous drive.

There is also disclosed herein vehicles, computer readable media, and computer program products associated with the above-discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 15A shows no pipe effect and FIG. 15B shows free motion within the pipe, to reduce control effort when the vehicle is within tolerance margins;

DETAILED DESCRIPTION OF EXAMPLE EMBODIMENTS OF THE INVENTION

Figure 1:
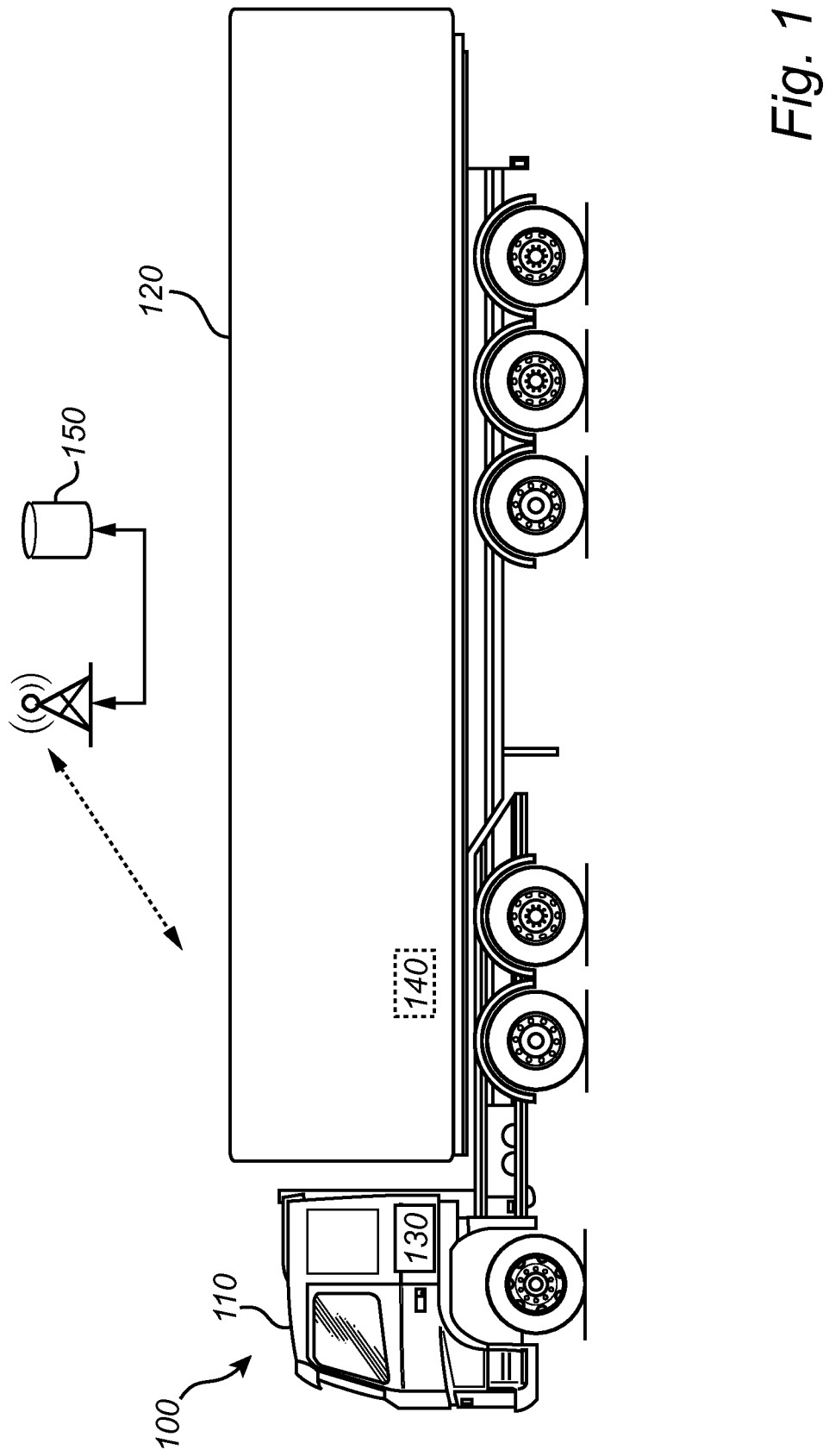
FIG. 1 schematically illustrates an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a truck or towing vehicle 110 configured to tow a trailer unit 120 in a known manner. The example tractor 110 in FIG. 1 comprises a vehicle control unit (VCU) 130 configured to perform various vehicle control functions, such as path following and vehicle motion management. The trailer unit 120 may optionally also comprise a VCU 140. The vehicle 100 is optionally connected via wireless link to a remote server 150, which also comprises a control unit. The techniques disclosed herein may be performed by any of the control unit 130, 140, 150, or by a combination of one or more control units. An on-board VCU 130, 140 may also be parameterized by the remote server 150.

Figure 2:
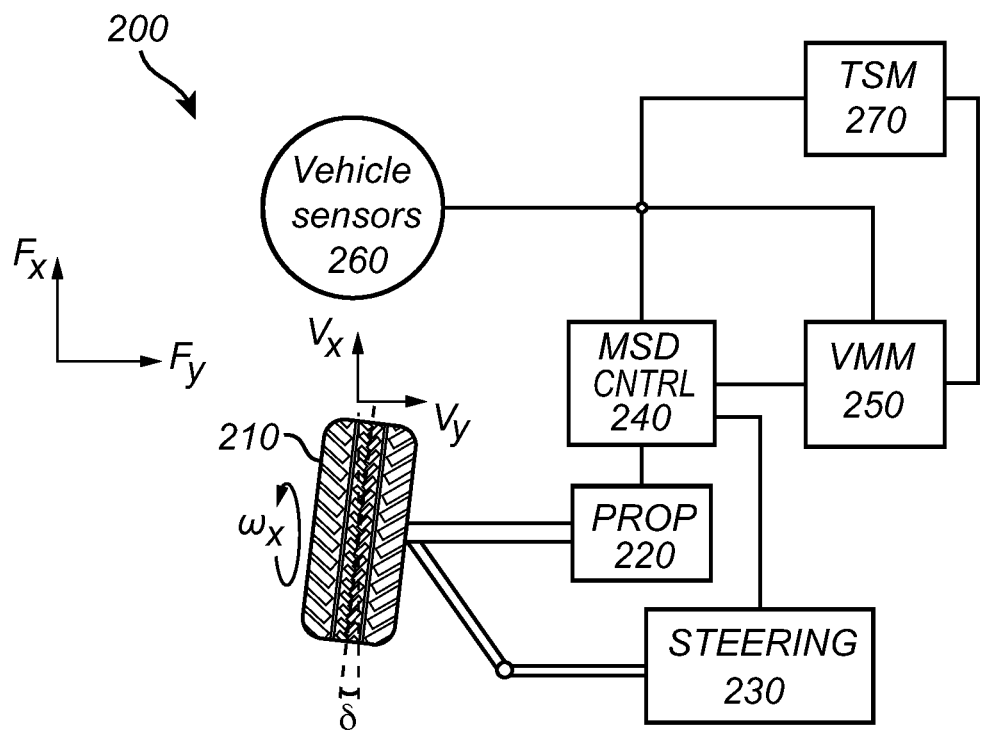
FIG. 2 shows a vehicle motion control system.

FIG. 2 schematically illustrates functionality 200 for controlling a wheel 210, e.g., on the tractor 110, by some example motion support devices (MSDs) here comprising a power steering arrangement 230 and a propulsion device 220 such as an electric machine (EM). The power steering arrangement 230 and the propulsion device 220 are examples of actuators which can be controlled by one or more MSD control units 240.

A traffic situation management (TSM) function 270 plans driving operations with a time horizon of, e.g., 1-10 seconds or so. This time frame corresponds to, e.g., the time it takes for the vehicle 100 to negotiate a curve. The vehicle manoeuvres, planned and executed by the TSM, can be associated with acceleration profiles and curvature profiles which describe a desired vehicle velocity and turning for a given manoeuvre. The TSM continuously requests the desired acceleration profiles $a_{req}$ and curvature profiles $c_{req}$ from a vehicle motion management (VMM) function 250 which performs force allocation to meet the requests from the TSM in a safe and robust manner and communicates requests to the different MSDs. The VMM function 250 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

Both the MSD control unit 240, the VMM function 250, and the TSM function 270 have access to sensor data from various on-board vehicle sensors 260, upon which vehicle control may be based. These sensors may comprise, e.g., global positioning system (GPS) receivers, vision-based sensors, wheel speed sensors, radar sensors and/or lidar sensors. The sensors are, among other things, configured to determine a vehicle location in relation to a reference path.

Figure 3:
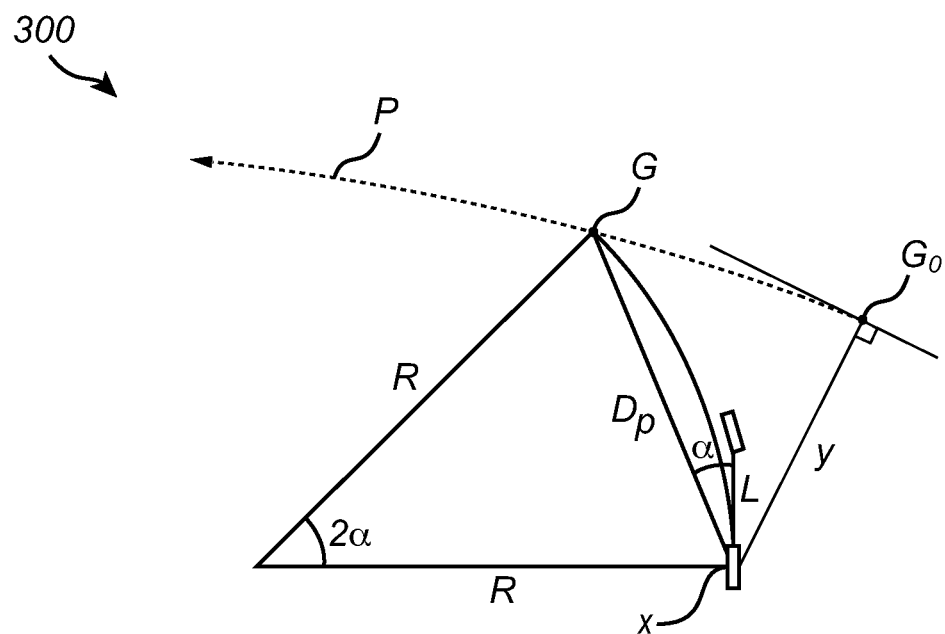
FIG. 3 illustrates path following by a pure pursuit-based method.
Figure 4:
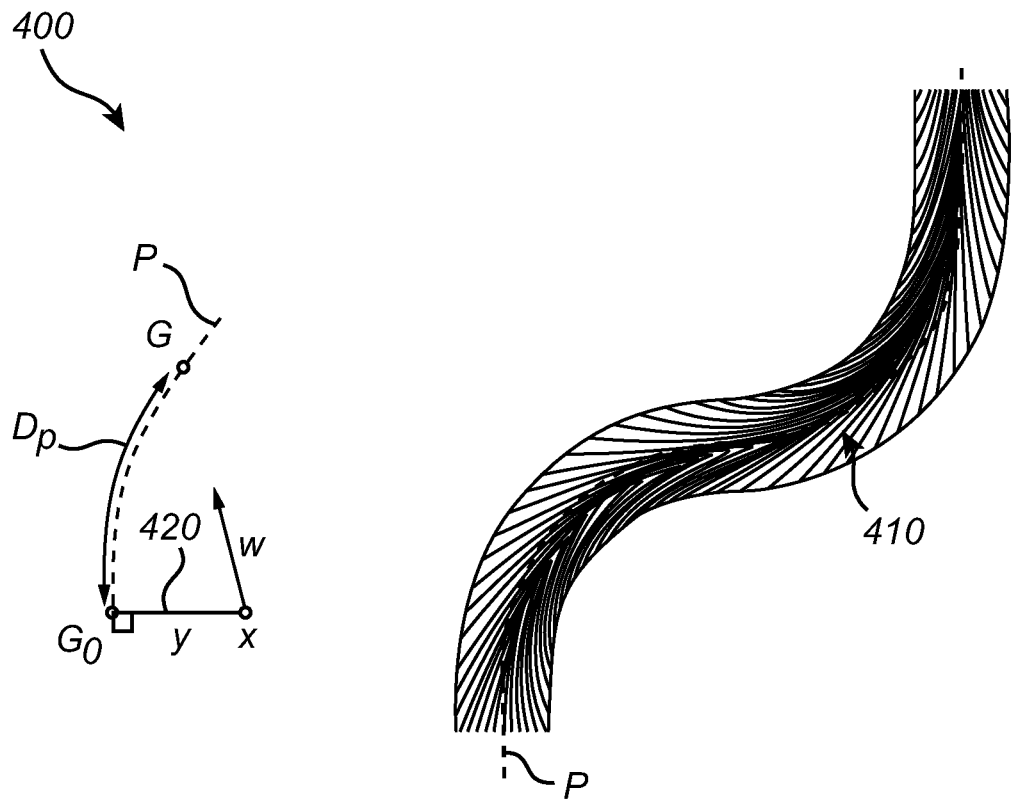
FIG. 4 illustrates path following by a vector guidance-based method.

FIGS. 3 and 4 illustrate two example path following methods where at least some of the techniques disclosed herein may be used with advantage.

FIG. 3 shows an example 300 of how a pure pursuit algorithm may control a vehicle to follow an intended path or reference path P. The vehicle is located at a vehicle location x, at a lateral deviation y from the reference path P. It is appreciated that lateral deviation from a reference path may be determined in a number of different ways. The definition used herein is the distance from the vehicle location x to the reference path P along a line y orthogonal to the path P, as illustrated in FIG. 3. The general concepts disclosed herein are of course applicable also to other definitions of lateral deviation.

Figure 7:
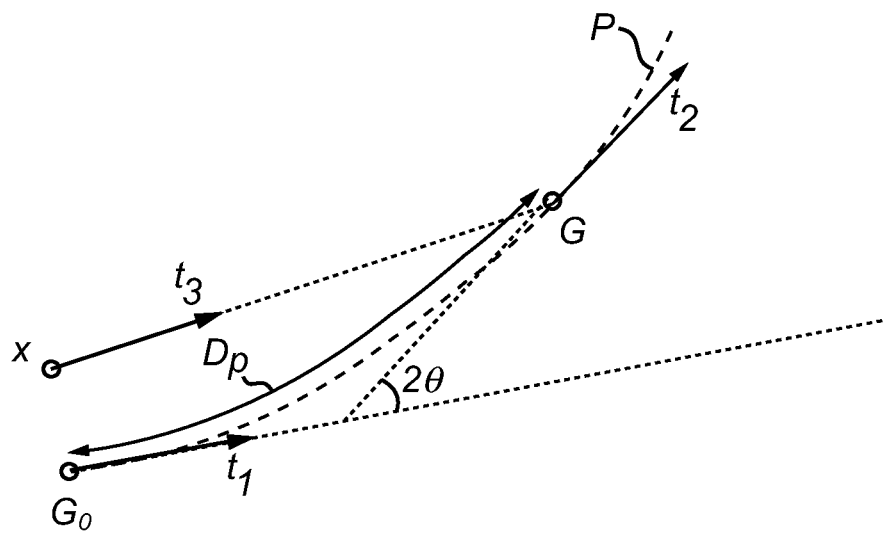
FIG. 7 shows a heavy-duty vehicle while cornering.

In the example 300 the vehicle has a wheel-base length L. The general idea behind the pure pursuit approach is to calculate the curvature that will take the vehicle from its current position x to a goal point G on the reference path P. The goal point is determined by defining a circle having radius R, such that the circle passes through both the goal point and the current vehicle position x. The vehicle is then controlled by a steering angle determined in relation to this circle as shown in FIG. 3. The selection of the goal point G plays an important role in the behavior of the pure pursuit algorithm. The goal point is selected such that the distance from the vehicle location x to the goal point always equals a preview distance $D_p$. (Alternatively, as illustrated in FIG. 7, the preview distance $D_p$ can be measured along the path P, starting from a reference location $G_0$ which is the point on the path P that is closest to the vehicle position x.)

Further details related to pure-pursuit algorithms of this type are given in "Implementation of the pure pursuit path tracking algorithm", by R. C. Coulter, Carnegie-Mellon University, Pittsburgh PA Robotics INST, 1992, and also in "Development of lateral control system for autonomous vehicle based on adaptive pure pursuit algorithm", Park, Myung-Wook, Sang-Woo Lee, and Woo-Yong Han, 14th International Conference on Control, Automation and Systems (ICCAS 2014), IEEE, 2014.

As mentioned, such preview methods are insensitive to small deviations from the reference path, and tracking performance suffers on curvature transitions, e.g. from a straight to a curve—the vehicle 'cuts the corner' at these transitions, even when the target is to follow the reference path. In the above-cited Park (2014), a PID controller is introduced to feedback errors in lateral position. This additional controller acts in parallel to the pursuit controller.

The PID controller addresses weak action near the reference path but can lead to large demands when the lateral offset is large; careful parameter tuning is needed to avoid oscillations developing. Gain scheduling may be used to try to overcome such issues, but the methods are ad-hoc and lead to a more complex controller whose performance cannot be guaranteed.

In another approach, optimal control accounts for constraints, performance criteria and uniformity of control effort by performing optimization in real-time. Techniques such as model predictive control (MPC) or nonlinear programming (NP) are used to compute the required steering actions. In principle, these techniques can address the limitations of preview control. Optimal control methods do come with their own difficulties, however, including:

(a) Computational cost. In contrast with the simple geometric algorithms of preview control, optimal control methods use computationally heavy algorithms—typically Nonlinear Programming (NP) or Quadratic Programming (QP)—for function minimization in the presence of constraints.

(b) Choice of weighting parameters. The underlying cost function for optimal control (typically quadratic) is typically populated with multiple weighting constraints. For high order systems the number can be large, and these must also be further 'tuned' or 'optimized'.

(c) Iteration and convergence. NP and QP methods do not have guaranteed convergence times, so in real-time application there is the possibility that the method will not produce an answer in the available time.

To solve the problem of minimizing the jerkiness within the pipe, one can formulate this problem as a minimum-time optimization problem, as is done in Berntorp, Karl, et al. "Models and methodology for optimal trajectory generation in safety-critical road-vehicle manoeuvres." *Vehicle System Dynamics* 52.10 (2014): 1304-1332. The path generation by solving the optimization problem can be seen in FIG. 6 of Berntorp (2014). Here, the vehicle is negotiating a very sharp curve, and the optimization finds a solution which reduces the curvature near the apex of the curve. Despite the greater width of the road boundary, the analogy can be drawn using such adaptation and optimization formulation for flow generation within the pipe.

Another way of generating a smooth path which smoothens out the original sharp turning is by fitting an $n^{th}$-order polynomial function $$p(s) = a_0 + a_1 s + a_2 s^2 + \ldots + a_n s^n$$

to the track centerline (acting as reference path). In particular, the polynomial may be fitted to a finite number of pre-selected points $x_0, \ldots, x_{k-1}$ on the track centerline. Mathematically, the polynomial fitting can be expressed as a minimization of a norm (here, a 2-norm) of the total deviation S, from the pre-selected points:

$$\min_{a_0, \ldots, a_n} S = \sum_{i=0}^{k-1} [x_i - p(s_i)]^2$$

where $s_i$ can for example be set to $$s_i = \operatorname*{argmin}_{s}[x_i - p(s)].$$

The values of $a_0, \ldots, a_n$ for which the minimum is achieved will be the coefficients of the fitted polynomial. Preferably, the order n of the polynomial is low, such as 10 or less, such as 5 or less, such as 3. The pre-selected points $x_0, \ldots, x_{k-1}$ may be distributed over a length $D_{opt} > 0$ of the reference path P. This will cause the minimization to search among vehicle paths extending up to a nonzero forward horizon corresponding to $D_{opt}$.

To achieve the smoothness of the path, on the other hand, the optimization problem can be formulated as to minimizing a second derivative of the curvature vector. The second derivative is with respect to the path length s. The second derivative can be approximated as a second-order difference matrix:

$$D_2 = \begin{bmatrix} 1 & -2 & 1 & & & \\ & 1 & -2 & 1 & & \\ & & 1 & -2 & 1 & \\ & & & \ddots & \ddots & \ddots \\ & & & & 1 & -2 & 1 \end{bmatrix}$$

that is, $$\frac{d^2}{ds^2} \kappa \approx D_2 \kappa$$

Such a problem can be solved offline and the polynomial coefficients can be stored if the pipe geometry is known beforehand. In the specific case where the path is approximated as a plurality of patched clothoid segments, it is efficient to apply the minimization to an $\ell^0$ norm of the curvature derivative, i.e., the number of nonzero elements. This minimizes the number of individual clothoid segments and thus the number of patching points.

The present invention combines the computational simplicity of Artificial Flow Guidance with the flexibility of flow adaptation or optimization within a limited region of interest (pipe), and suffers less from the drawbacks mentioned above in (a)-(c), if at all.

FIG. 4 illustrates an example 400 of a vector field guidance-based path following method. In this method a vector field 410 is generated, and the vehicle is controlled according to the vector w at the current vehicle location x. Each vector w is determined such that it points from a location x towards a respective goal point G on the reference path P. The goal point is again determined based on a preview distance $D_p$, although now the preview distance is a distance measured along the reference path P from a reference location $G_0$ on the reference path P. This reference location $G_0$ is a location on the path P intersected by a straight line orthogonal to the path P at the reference location $G_0$ which also passes through the vehicle location x, as shown in FIG. 4. Vector field guidance-based methods were discussed by Gordon, Best and Dixon, in "An Automated Driver Based on Convergent Vector Fields", *Proc. Inst. Mech. Eng. Part D*, vol. 216, pp 329-347 (2002). Vector-field based methods are also discussed in Mengxuan Song, Nan Wang, Timothy Gordon and Jun Wang, "Flow-field guided steering control for rigid autonomous ground vehicles in low-speed maneuvering", *Vehicle System Dynamics*, vol. 57 (2019), issue 8, pp. 1090-1107, DOI: 10.1080/00423114.2018.1512715. Some additional details related to vector field-based guidance are given by Semsar-Kazerooni, Elham, et al. in "Multi-objective platoon maneuvering using artificial potential fields", IFAC-PapersOnLine 50.1 (2017), pp. 15006-15011.

A slightly more advanced version of a vector field guidance-based path following method will be discussed in connection to FIG. 7 below.

Both the pure pursuit and the vector field-based path following methods rely on a preview distance $D_p$, which is also sometimes referred to as a look-a-head distance. The preview distance relates to how distant the goal point is along the reference path P from the location of the vehicle. Intuitively, a short preview distance $D_p$ results in an increased control effort, i.e., more powerful steering control action, in order to reduce the lateral deviation y more quickly. A longer preview distance $D_p$ instead results in a smoother more slow control action, associated with a reduced control effort. A longer preview distance $D_p$ of course reduces the ability of the vehicle 100 to successfully negotiate corners and more sharp turns, which is a drawback.

Herein, the term control effort is to be interpreted as the amount of effort spent in bringing the vehicle closer to the track. Control effort may, e.g., be measured in terms of lateral acceleration, vehicle yaw rate, generated side-slip, applied steering angle magnitude, overall consumed energy by actuators on the vehicle, and the like.

Figure 5:
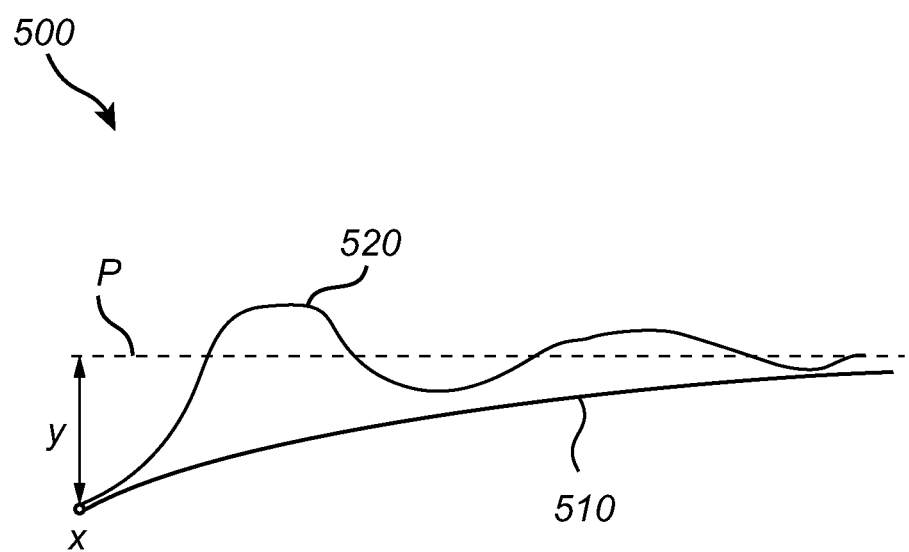
FIG. 5 exemplifies path following behavior for different preview distance settings.

FIG. 5 illustrates the effects of two different settings of the preview distance $D_p$ in following a straight reference path P, starting from a vehicle location x at a lateral deviation y from the path P. The example 510 shows what happens if the preview distance is selected relatively large, while the example 520 shows what happens if the preview distance is selected to be shorter.

The techniques disclosed herein improve the guidance of automated or semi-automated vehicles by adjusting the preview distance $D_p$ in dependence of the lateral offset (or deviation) γ from the intended path P. Further improvements can be obtained by also altering the preview distance in dependence of the vehicle speed in the longitudinal direction, i.e., in the direction of vehicle heading.

Current path following methods suffer from incomplete and ad-hoc algorithms for setting preview distance $D_p$. For example, it has been proposed to be set $D_p$ proportional to speed, or as a function of some road curvature criteria. These adaptations are carried out to reduce preview distance when the curvature is high and increase preview distance when the curvature is low. However, current methods do not take account of lateral offset y from the reference path P. This results in diminishing control effort and poor off-tracking performance when the vehicle is close to the reference path, i.e., when the tracking error is comparably small. This has a negative effect on the off-tracking performance of articulated vehicles, such as the vehicle 100.

To improve path following performance when the vehicle is close to the reference path P, it is proposed to adjust the preview distance continuously based on an expanded set of criteria which also comprises lateral deviation y from the reference path. This reduces the problem of a low control effort near to the reference path. In fact, for some scenarios the preview distance can be configured such as to result in a stable control effort independently of the current lateral deviation from the reference path P.

One of the novel technical features disclosed herein is to adapt the preview distance based on multiple criteria, with design parameters closely related to control effort. The path following methods are optionally based on vector field guidance, which constructs a vector field to provide a target motion direction (or acceleration), as exemplified in FIG. 4 above.

Another feature of the methods disclosed herein is that the control effort can be regulated towards some desired control effort, or at least kept below a maximum desirable control effort. This control effort may be determined in dependence of a vehicle state or type, and potentially also in dependence of a road conditions, such as if the road friction is low or high. For instance, control effort may be reduced in scenarios with low road friction, and in case the vehicle carries heavy load.

Figure 6:
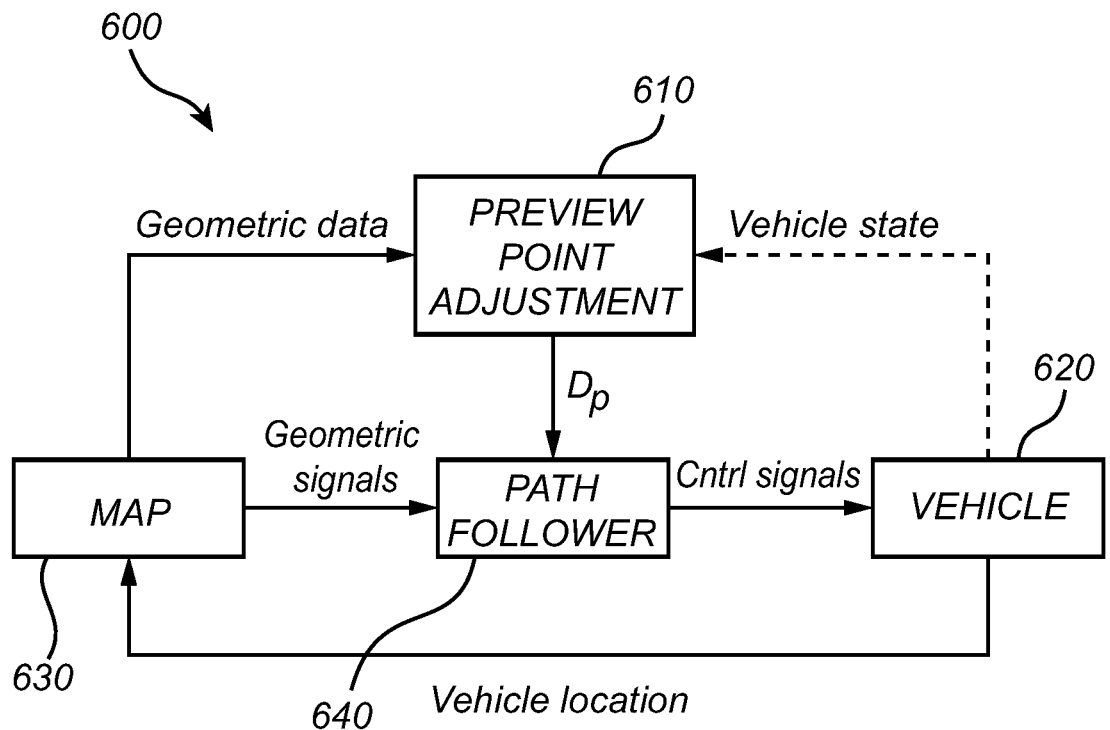
FIG. 6 schematically illustrates a vehicle control function architecture.

The techniques described herein may be arranged to operate as a 'preview point supervisor' which acts in real time according to speed, curvature and lateral offset (or deviation), as shown by the control architecture 600 exemplified in FIG. 6. A feedback loop from the vehicle 620 to the Preview Point Adjustment module 610 is shown as a dashed line; this is to indicate that only slowly changing variables such as speed and lateral offset are used; dynamic states such as yaw rate and body sideslip angle are not used, since adapting $D_p$ according to these states may interfere with the dynamic stability in the lower layer control loops, i.e., the control functions performed by the VMM 250 and or in the MSD control units 240 of the vehicle 100. In vector field guidance-based methods such as artificial flow guidance (AFG), only vehicle states associated the flow map are fed back on the dashed line.

The determined preview distance $D_p$ is sent to a path follower module 640, which may, e.g., implement a vector field-based path following method. The vehicle 100 is then controlled based on the generated reference data, in a known manner. Thus, as part of this control the path follower module transmits control signals to the various vehicle control units. In a pure pursuit-based path following strategy, the control signal comprises a steering angle command, while more generally it can comprise a curvature request and/or flow vector direction.

The preview point adjustment module 610 determines a current preview distance $D_p$ to use based on geometric data from a map function 630 and on the vehicle state signal. This preview distance is at least partly determined based on the lateral deviation y from the reference path P, such that the preview distance $D_p$ increases with an increasing lateral deviation y from the reference path P, and decreases with a decreasing lateral deviation γ. In a pure pursuit algorithm, the lateral deviation y is determined as indicated in FIG. 3, while the lateral deviation in a vector field-based method is determined as indicated in FIG. 4. Of course, other ways of defining lateral deviation are also possible, where all methods have in common that the lateral deviation y is indicative of a lateral control error measured from the reference path laterally out to a vehicle location x in some way.

FIG. 7 illustrates path following when cornering, i.e., when the reference path P exhibits curvature. The methods disclosed herein may be used with advantage in vector-field guidance methods. In particular, the directions of the vectors w in the vector field can be adjusted in dependence of the path curvature, to avoid 'cutting curves'. For instance, the following relationship (first flow field) may be used to adjust the preferred direction of the vehicle when cornering $$w_1 = t_3 + \frac{t_1 - t_2}{2\cos\theta}$$

Here $t_3$ is the unit-length vector pointing directly to the preview point, or goal point G, while $t_1$ and $t_2$ are unit-length tangent vectors at the local point $G_0$ and target point G respectively. Angle $\theta$ is half the angle between the two tangent vectors on the reference path. This causes the flow vector $w_1$ to become tangent to the reference path in the special case where
  (i) x is located on the reference path, and
  (ii) the curvature of the reference path is constant between $G_0$ and G.

Preferably, for the purpose of computing the vectors $t_2$ and $t_3$, the goal point is computed in accordance with a preview distance ($D_p$) for which no minimum review distance $L_0$ is enforced. It is appreciated that the addition $$\frac{t_1 - t_2}{2\cos\theta}$$

is a directional adjustment to the vector field which accounts for path curvature. In the special case $t_1=t_2$ there is no curvature and also no adjustment to the direction of the vector $t_3$. The form of this equation is derived from the condition that w be tangent to the reference path in all cases where the vehicle is positioned on the reference path and the curvature is constant, including the case of zero curvature. The above equation remains valid in cases of variable curvature, though small deviations from tangency may occur. Similar concepts were discussed by Gordon, Best and Dixon, "An Automated Driver Based on Convergent Vector Fields", *Proc. Inst. Mech. Eng. Part D*, vol. 216, pp. 329-347, 2002.

In further developments of the embodiments applying artificial flow guidance methods, the vehicle is controlled selectively, in accordance with the current lateral deviation y of the vehicle. More precisely, the vehicle may be controlled in accordance with the direction $w_1$ of the first flow field when the lateral deviation y exceeds a threshold $y_{max}$, and in accordance with an optimization-based path when the lateral deviation does not exceed the threshold.

Figure 8:
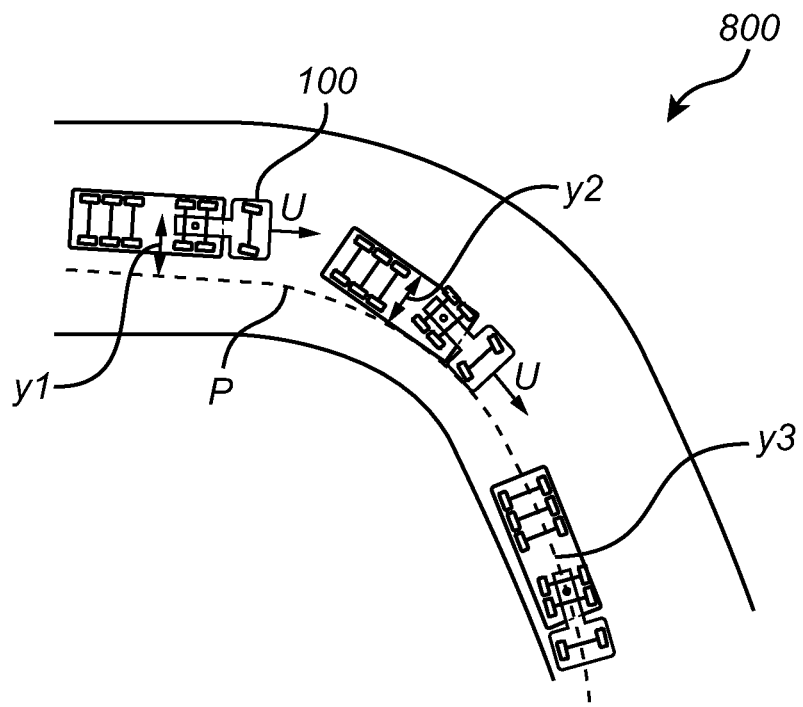
FIG. 8 illustrates path following of a curved path.

FIG. 8 illustrates an example scenario 800 where a heavy-duty vehicle 100 maneuvers along a reference path P through a curve. The vehicle 100 has a longitudinal velocity U, and starts out at an initial lateral deviation y1, which then decreases to y2 and further decreases to y3.

Figure 9:
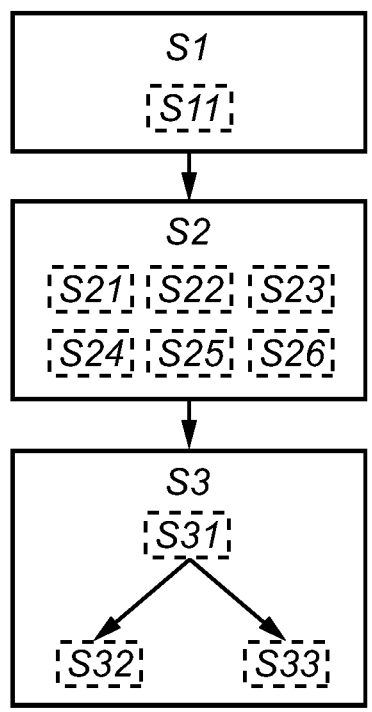
FIG. 9 is a flow chart illustrating methods.

FIG. 9 is a flow chart which illustrate methods that summarize the above discussion. There is illustrated a method for controlling a heavy-duty vehicle 100 to follow a reference path P. The method comprises obtaining S1 the reference path P to be followed by the vehicle 100. The reference path P may, e.g., be determined based on map data and on a transport mission to be accomplished, as discussed above. The position x of the vehicle in relation to the path P may be determined using vehicle on-board sensors such as GPS receivers, radar transceivers, vision-based sensors, and the like. The lateral deviation y of the vehicle location x from the reference path P may be determined by similar means. For instance, the TSM function 270 shown in FIG. 2 may desire to control the vehicle through a cornering maneuver associated with a given curvature. This curvature then determines the reference path P to be adhered to during the cornering maneuver.

The method also comprises determining S2 a goal point G along the path P to be used as a steering reference from a vehicle location x in vicinity of the path P, where the goal point G is distanced along the path P by a preview distance $D_p$ measured from a reference location x, $G_0$ associated with the vehicle location x. In case the method is being executed as part of controlling the vehicle 100 according to a pure pursuit-based path following algorithm or similar, then the reference location x may simply equal the vehicle location. In case the method is being executed as part of controlling the vehicle 100 according to a vector field guidance-based path following algorithm, then the reference location $G_0$ may be determined as a location on the path P intersected by a straight line 420 orthogonal to the path P at the reference location $G_0$ and passing through the vehicle location x, as exemplified in FIG. 4 above. Here, the reference location $G_0$ is the point on the path P that is closest to the vehicle position x; see also FIG. 3. It is appreciated that more than one path following algorithm can be executed in parallel by the control units 130, 140, 150, e.g., for redundancy purposes.

The method is advantageously applied in performing a Lane Keep Assistance (LKA) function. These functions may use vehicle on-board sensors such as cameras and radars to determine a geometry of a road ahead of the vehicle, and to determine the reference path P in dependence of this road geometry. The road geometry may, e.g., be determined from lane markings or the like in a known manner.

The methods disclosed herein are of course also applicable for semi-autonomous or autonomous drive of the articulated vehicle 100.

The method also comprises determining S31 whether a lateral deviation y of the vehicle location x from the reference path P exceeds a threshold lateral deviation $y_{max}$. On this basis, the vehicle 100 is controlled S32 in accordance with the direction $w_1$ of a first flow field if the lateral deviation y exceeds the threshold lateral deviation $y_{max}$. Otherwise, the vehicle 100 is controlled S33 in accordance with the direction $w_{pipe}$ of a pipe flow substantially parallel to the reference path P or in accordance with an optimization-based path 1302. It is appreciated that the path following algorithms disclosed herein may be applied for steering vehicle units other than the tractor 110. For instance, an articulated vehicle may comprise other steerable vehicle units, such as self-powered dolly vehicle units or powered trailers. These vehicle units may also be controlled according to the techniques disclosed herein.

According to some embodiments, the preview distance $D_p$ is determined at least partly based on a lateral deviation y of the vehicle location x from the reference path P, such that the preview distance $D_p$ increases with an increasing lateral deviation y from the reference path P, and decreases with a decreasing lateral deviation γ. This way the control effort is maintained even when the lateral deviation becomes small, which is a problem that has been known to affect previously proposed path following algorithms. In particular, the method may optionally comprise determining S21 the preview distance $D_p$ also at least partly based on a longitudinal velocity U of the vehicle 100, such that the preview distance increases with an increasing longitudinal velocity U. This means that a smoother vehicle control is configured in case the vehicle drives at high velocity, compared to when the vehicle is moving more slowly. Naturally, abrupt turning maneuvers are not desired at high velocity.

One or more tuning parameters may be introduced in the strategy for determining the preview distance. For instance, the method may comprise determining S22 the preview distance $D_p$ also based on a first tuning parameter a, wherein a control effort for controlling the vehicle 100 to follow the path P increases with an increase in the first tuning parameter a. Thus, this first tuning parameter a represents a means for adjusting the control effort of the path following algorithms that use the preview distance. Control effort generally refers to the magnitude of the vehicle motion management operations targeted at bringing the vehicle in closer adherence to the reference path P. For instance, a large control effort is more likely to generate higher vehicle lateral accelerations compared to a smaller control effort. The first tuning parameter a can advantageously be adjusted in dependence of a curvature of the reference path P. For instance, different path curvatures can be accounted for by determining S23 a centripetal lateral acceleration component associated with the reference path P at the reference location and adjusting the first tuning parameter a based on the centripetal lateral acceleration component.

The first tuning parameter may also be adjusted in dependence of a vehicle state or vehicle type, such as if the vehicle 100 is heavily laden or not, and perhaps also if the vehicle 100 has new tires or not. The first tuning parameter may be configured from a remote entity such as the remote server 150, or by a technician during servicing. The driver may also configure the parameters manually in dependence of a personal preference or operating scenario.

Benefits can be obtained by adapting $D_p$ according to the curvature or mean curvature of the reference path, e.g., to improve precision when maneuvering in restricted spaces. This occurs indirectly via speed reduction, but further advantage can be achieved by adapting the acceleration parameter a according to an equation of the form $a=\phi(\kappa)$. Here $\kappa$ is any measure of curvature of the reference path, and $\phi(\kappa)$ can be an increasing function, so that increased control effort is applied to path-following whenever greater precision is required. According to an example, the method comprises determining S24 the preview distance $D_p$ as $$D_p = \frac{Uy}{\sqrt{2ay+b}}$$

where U is the longitudinal velocity of the vehicle 100 (as indicated in FIG. 8), y is the lateral deviation (or path deviation) magnitude, a is the first tuning parameter, and b≥0 is a second tuning parameter. Parameter b is an adjustment parameter, which can be used to control the behavior of the path following close to the reference path. Parameter b, when greater than zero, may have an effect of reducing nonlinearity in the approach to the reference path. It is understood that the lateral deviation magnitude y is a non-negative variable.

A minimum distance may also be added to the preview distance determination, which lower bounds the preview distance, i.e., $$D_p = \max\left(\frac{Uy}{\sqrt{2ay+b}}, L_0\right)$$

This accounts for possible erratic steering when $$\frac{Uy}{\sqrt{2ay+b}}$$

becomes a small, e.g., when speed U is very small or when path deviation magnitude y tends to zero. Use of $L_0$ reduces sensitivity to time delays in the steering actuator and takes account of the physical maneuvering limitations of a large vehicle. Of course, other expressions $f_0(\cdot)$ for preview distance are also possible to lower bound in this manner.

Figures 10, 11:
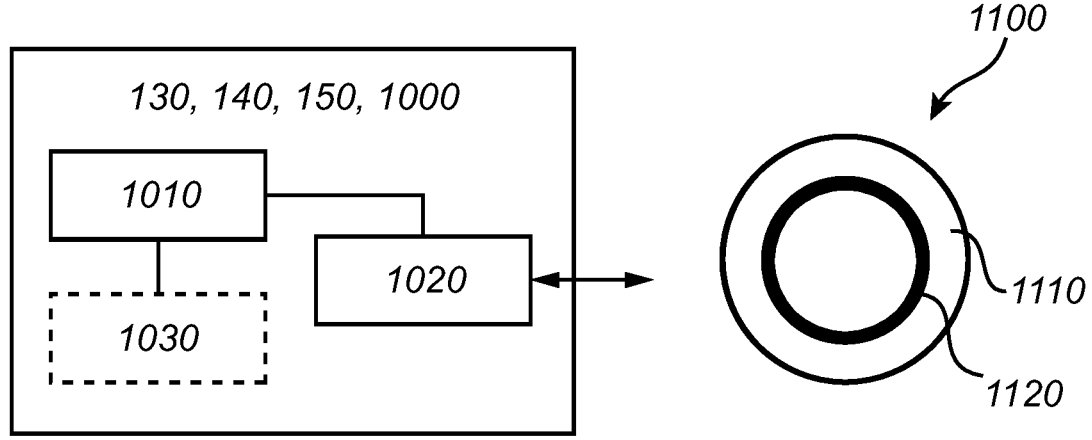
FIG. 10 schematically illustrates a control unit.
FIG. 11 shows an example computer program product.

FIG. 10 schematically illustrates, in terms of a number of functional units, the components of a control unit 130, 140, 150, 1000 according to embodiments of the discussions herein. This control unit may be comprised in the vehicle 100, e.g., in the form of a VMM or TSM unit. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 9.

Consequently, there is disclosed herein a control unit 130, 140, 150 for controlling a heavy-duty vehicle 100 to follow a reference path P. The control unit comprises processing circuitry 1010 configured to obtain the reference path to be followed by the vehicle; determine a goal point along the path to be used as a steering reference from a vehicle location in vicinity of the path, where the goal point is distanced along the path by a preview distance measured from a reference location associated with the vehicle location; determine, on the basis of the goal point, a direction $w_1$ of a first flow field associated with the reference path; determine whether a lateral deviation y of the vehicle location from the reference path exceeds a threshold lateral deviation $y_{max}$; and control the vehicle in accordance with the direction $w_1$ of a first flow field if the lateral deviation exceeds the threshold lateral deviation, and otherwise control the vehicle in accordance with the direction $w_{pipe}$ of a pipe flow substantially parallel to the reference path or in accordance with an optimization-based path.

For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed. In particular, there is disclosed a control unit 115, 210, 1000 for controlling reversal of an articulated vehicle 100, 300 comprising a tractor 110 and one or more towed vehicle units 120, 130, 140, 150, the control unit comprising processing circuitry 1010, an interface 1020 coupled to the processing circuitry 1010, and a memory 1030 coupled to the processing circuitry 1010, wherein the memory comprises machine readable computer program instructions that, when executed by the processing circuitry, causes the control unit to perform the methods discussed above in connection to FIG. 8.

The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

FIG. 11 illustrates a computer readable medium 1110 carrying a computer program comprising program code means 1120 for performing the methods illustrated in FIG. 8, when said program product is run on a computer. The computer readable medium and the code means may together form a computer program product 1100.

As seen above, Artificial Flow Guidance (AFG) is an existing method for vehicle guidance (high level motion reference) which uses a fluid flow analogy in place of specifying a vehicle path. AFG is suitable for autonomous motion control of vehicles, including combination and longer combination vehicles. In case of a vehicle (vehicle combination) comprising n rigid units, n+1 tracking points are used to fully constrain the lateral vehicle motion. In existing AFG implementations, the associated streamlines (generalized motion targets) converge to a unique reference path. Tracking points are typically defined on the front axle and rear axle of a tractor or rigid truck, or on the rear axle of the trailer or trailers or semi-trailers. The condition can be phrased: "if those tracking point track the reference path P or stay within the pipe 1204, then the motion of all parts of the vehicle stay within acceptable bounds." It follows by a theoretical geometry-based result that it is necessary and sufficient to constrain n+1 tracking points if the vehicle combination has n rigid units. With the tracking points defined, any suitable two-dimensional rigid-body kinematic model is used to 'interpolate' the defined motions; the corresponding motion at the steering axle can be calculated, even if the steering axle does coincide with a tracking point. Then the steering tracks a motion direction which is consistent with the required motions of the remote tracking points.

Figure 12A:
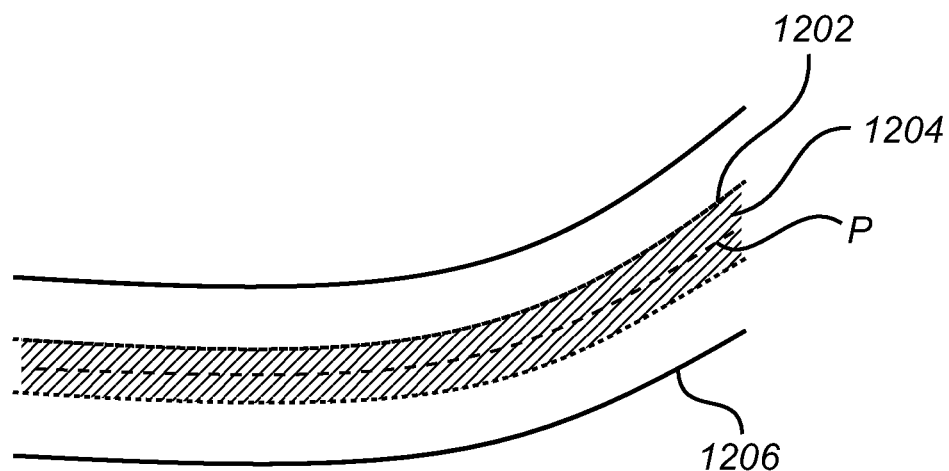
FIGS. 12A-12B show, in the plane of a reference path P (FIG. 12A) and in a normal plane (FIG. 12B), said reference path surrounded by a boundary region.
Figure 12B:
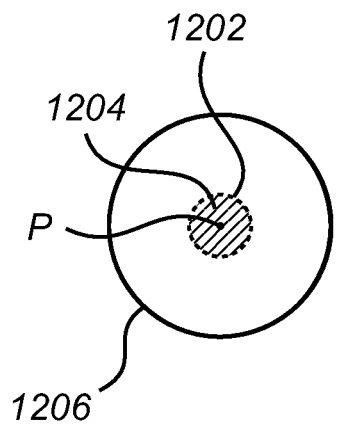

If the road is visualized as a pipe, as shown in FIGS. 12A-12B, the region 1204 inside the inner boundary 1202 closest to the reference path P represents the portion of the road in which the tracking points on the vehicle 100 are to be constrained. The outer boundary 1206 (solid line) represents the road or lane boundary, while the inner boundary 1202 (dashed) represents the pipe, which is intended to capture and guide the vehicle tracking points. The radius of the pipe corresponds to the threshold lateral deviation y_max. When the AFG flow reference enters the pipe through the inner boundary 1202, it will never exit in normal conditions and in the absence of perturbations. Once inside the pipe 1204, tracking points become 'trapped', and hence the lateral motion targets can normally be observed.

Figure 13:
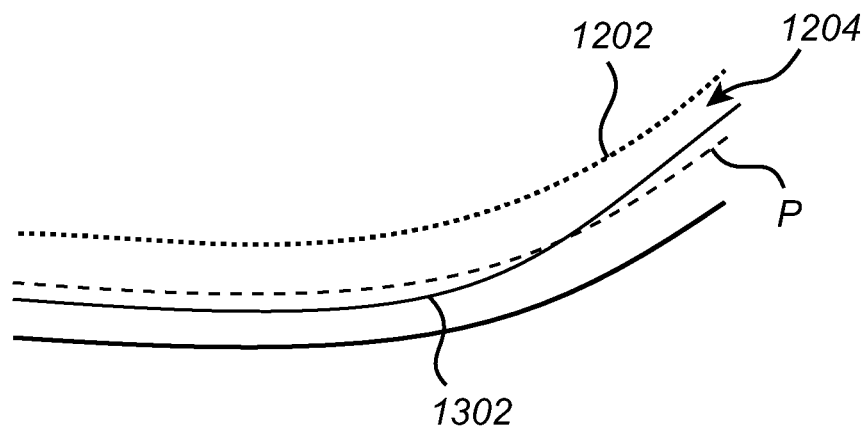
FIG. 13 illustrates vehicle movement inside the boundary region (or 'pipe')

In some embodiments, as illustrated in FIG. 13, the vehicle 100 is controlled in accordance with an optimization-based path 1302. The optimization-based path 1302 can be determined using a cost function that penalizes acceleration above a threshold acceleration, especially a threshold lateral acceleration. Alternatively or additionally, the optimization-based path 1302 can be determined by minimizing total travel time of the vehicle 100, as implemented in Berntorp (2014). Alternatively or additionally, the optimization-based path 1302 can be determined by minimizing a norm of a second derivative of the path's curvature; some details relating to such a minimization, including possible approximations, were presented above. Alternatively or additionally, the optimization-based path 1302 can be determined by fitting a low-degree polynomial to the reference path P; see above. Under any of these options, a constraint may be added that the optimization-based path 1302 must not exceed the threshold lateral deviation $y_{max}$. A still further possibility is to include, in the objective function of the optimization problem, a penalty with a gradual onset, which starts when 80-90% of the threshold lateral deviation $y_{max}$ is reached. The use of such a penalty allows the vehicle 100 to use the full width of the pipe 1204 fairly freely but normally keeps the vehicle 100 inside the pipe 1204 in the absence of significant perturbations.

In other embodiments, the vehicle 100 is controlled in accordance with the direction $w_{pipe}$ of a pipe flow that is parallel or substantially parallel to the reference path P inside the pipe 1204. This pipe-flow approach uses the inherent freedom of AFG to replace the reference path, defining a region ('pipe') within which the flow (motion target) is adapted or optimized. In the same way that a pipe is used to guide and constrain a fluid, the pipe referred to here is to guide and constrain the tracking points.

Similar to the first flow field, the pipe flow can be generated at any relevant location on the basis of the road geometry using a constructive geometric method. It is recalled that FIG. 3 illustrates how the first flow field can be generated by such a method, and this was further elaborated with reference in FIG. 7. Point x represents the location of a 'tracking point' (or reference point) on the vehicle, G represents a goal point distanced along the path P by a preview distance $D_p$, and $G_0$ is the closest point to x on the reference path P. By calculating tangents at these points, the AFG vector can be determined using the equation $$w_1 = t_3 + \frac{t_1 - t_2}{2\cos\theta}$$

for any $y > y_{max}$. It is recalled that the preview distance can for example be determined as $$D_p = \frac{Uy}{\sqrt{2ay + b}}$$

where U is the longitudinal velocity of the vehicle, y is the lateral deviation, a is the first tuning parameter, and b≥0 is a second tuning parameter. According to the present embodiments, this definition is extended into $$w(y) = \begin{cases} w_{pipe}, & y \leq y_{max}, \\ w_1, & y > y_{max}. \end{cases}$$

Figure 14:
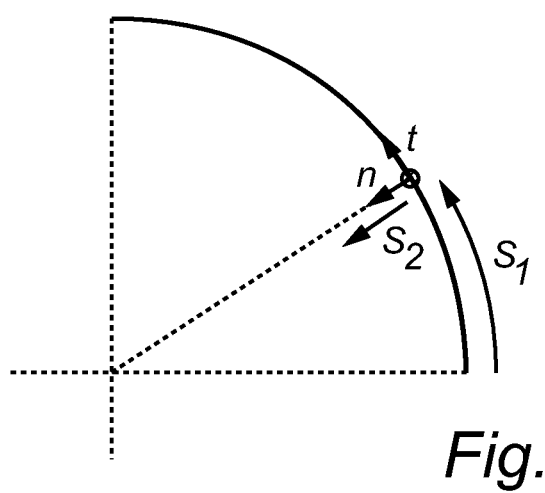
FIG. 14 illustrates a transformation from cartesian coordinates to curvilinear coordinates (or track coordinates, or path coordinates)

Equations pipe flow $w_{pipe}$ will be given next. It is convenient to express the pipe flow in curvilinear coordinates relative to a moving reference frame on the track centerline (reference path), which represents the central axis of the 'pipe'. As shown in FIG. 14, the first coordinate corresponds to a tangential direction t and the second coordinate corresponds to a centripetal direction n directed towards an instant center of rotation. The physical displacement vector resulting from a small coordinate displacement $(\delta s_1, \delta s_2)$ is:

$$\delta x = \gamma \delta s_1 t + \delta s_2 n$$

Here, $s_1$ is the longitudinal distance along the path and $s_2$ is the lateral displacement from the path. For $s_2 \neq 0$ there is a distance contraction associated with $\delta s_1$, given by:

$$\gamma = \frac{R - s_2}{R} = 1 - \kappa s_2$$

where $\kappa = R^{-1}$ is the local path curvature on the track centerline. Similarly, the flow vectors $w=(w_1,w_2)$ (cartesian coordinates) and $w=(\tilde{w}_1,\tilde{w}_2)$ (path coordinates) are related by:

$$w = \gamma \tilde{w}_1 t + \tilde{w}_2 n$$

Figure 15A:
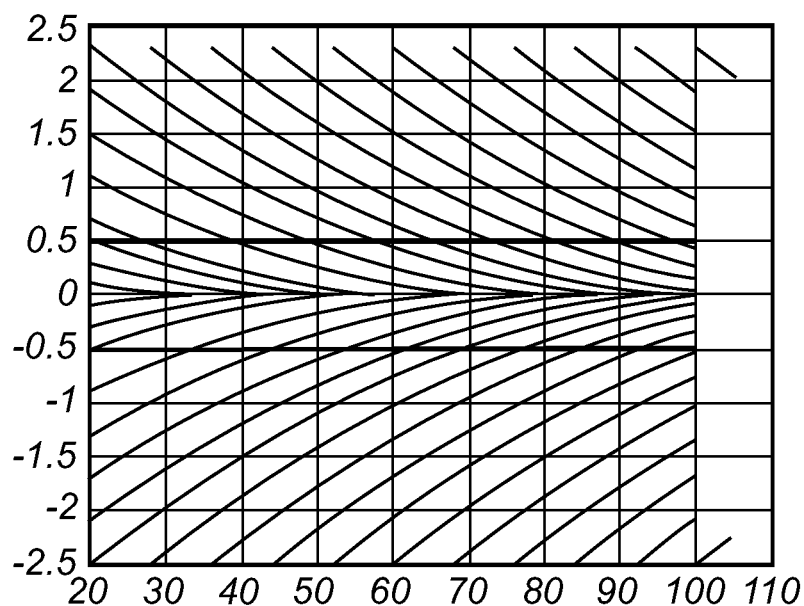
FIGS. 15A-15B are plots of flow patterns on a straight section of road where
Figure 15B:
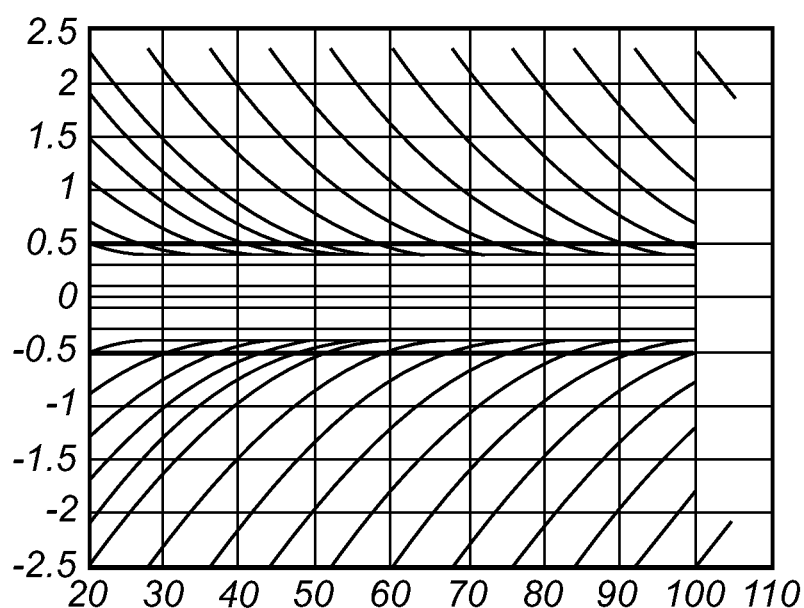

An example pipe-flow construction is now given. In its basic form, $\tilde{w}\_1=U$ is the longitudinal velocity and $\tilde{w}\_2=0$, making the flow pattern uniformly parallel to the pipe. In other words, the pipe flow w is parallel to the reference path P. This has the advantage of allowing a degree of lateral deviation from the pipe centerline, rather than forcing the tracking points to the center. The comparison is shown in FIGS. 15A-15B, where the upper plot 15A shows the traditional motion tracking, while plot 15B shows the parallel flow within the pipe. (NB: The pipe boundaries at ±0.5 m are actually parallel to each other; in the upper plot, especially, the flow pattern presents an optical illusion.) The new flow pattern ensures the vehicle enters and stays within the pipe boundary 1202, while removing the need to follow the center of the path, reducing control effort and lateral maneuvering acceleration.

The external flow (first flow field) and internal flow (pipe flow) can be matched, as in FIG. 15B via a suitable choice of one of the external flow parameters. This is achieved by imposing a constraint that the external flow becomes parallel to the pipe near to its boundary. From the equation for the preview distance $D_p$ just above, the angle of the vehicle relative to the pipe centerline, $\alpha$, is:

$$\tan \alpha = \frac{y}{D_p} = \frac{\sqrt{2ay+b}}{U}$$

For $\alpha=0$ to occur at or near the pipe boundary 1202, a requirement is imposed that $$b = -2ay_2$$

where $y_2$ is a constant that is slightly smaller (e.g., 10%, 20%) than the pipe radius $y_{max}$. Accordingly, the direction $w_1$ of the first flow field is oriented parallel to the reference path P at or near the threshold lateral deviation $y_{max}$.

In further embodiments within this group, the condition $\tilde{w}_2=0$ can be relaxed, particularly when the tracking points on the vehicle 100 negotiate a sharp change in curvature. One option for improved flow within the pipe might include adding a flow distortion function, such that the curvature of the flow is relaxed to increase the radius of the path taken by the vehicle when traversing a curve, thus locally reducing the acceleration. An example of this is shown in FIG. 13, with more detailed flow patterns shown in FIGS. 17 and 18. It is seen in FIG. 13 that when the vehicle 100 approaches the curve, the pipe flow tends to push the tracking points towards the outer pipe boundary to allow 'corner-cutting' within the pipe 1204.

Figure 16A:
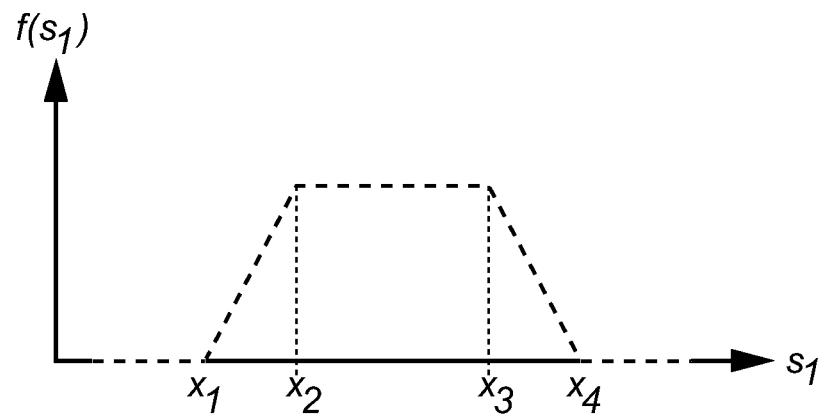
FIGS. 16A-16B are plots of the factors f(s_1) and g(s_2) of a flow distortion function.
Figure 16B:
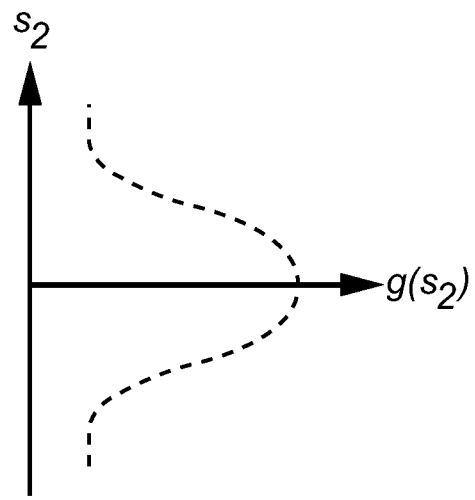

A simple flow distortion function on the form $$\tilde{w}_2 = f(s_1) g(s_2)$$

can be used. Here, $f(s_1)$ acts as switching function, defining portions of the reference path where lateral distortion occurs. A simple example is a piecewise linear function as shown in FIG. 16A, where $[x_2,x_3]$ corresponds to a segment with high curvature, e.g., where the curvature $\kappa$ exceeds a threshold curvature $\kappa_{max}$. Accordingly, $f(s_1)$ may be generated offline as soon as the reference path is known, namely, by identifying all segments with high curvature and adding ramps similar to $[x_1,x_2]$ and $[x_3,x_4]$. Function $g(s_2)$, as shown in FIG. 16B, is a bounding function (cut-off function) which acts across the pipe and tends to zero at the pipe boundary. An example bounding function, which will generate a positive lateral 'push' to the flow in the direction n, is given by $$g(s_2) = \begin{cases} \frac{1}{2}\left(1 + \cos\frac{\pi s_2}{y_{max}}\right), & s_2 \le y_{max}, \\ 0, & s_2 > y_{max}. \end{cases}$$

Accordingly, the pipe flow w will have a nonzero centripetal component in the segment $[x\_2,x\_3]$. It is seen in FIGS. 16A-16B that the flow acceleration in the vicinity of the reference path bends to reduce the acceleration effort required. In the definition of $g(s\_2)$, the transition point defined by the threshold lateral deviation $y\_{max}$ may be replaced by a slightly smaller or larger constant, e.g., reduced or increased by 10%, 20% or the like. The bounding function $g(s\_2)$ can be defined independently of the reference path P.

Figure 17:
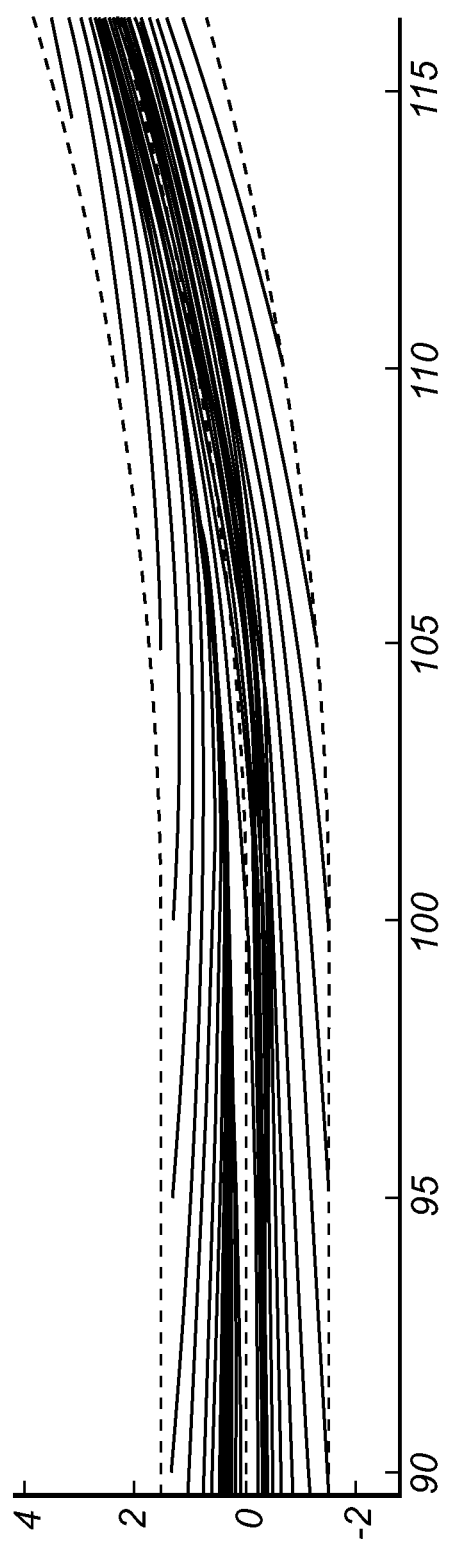
FIG. 17 is a plot in cartesian coordinates of a flow field in the vicinity of a reference path.
Figure 18:
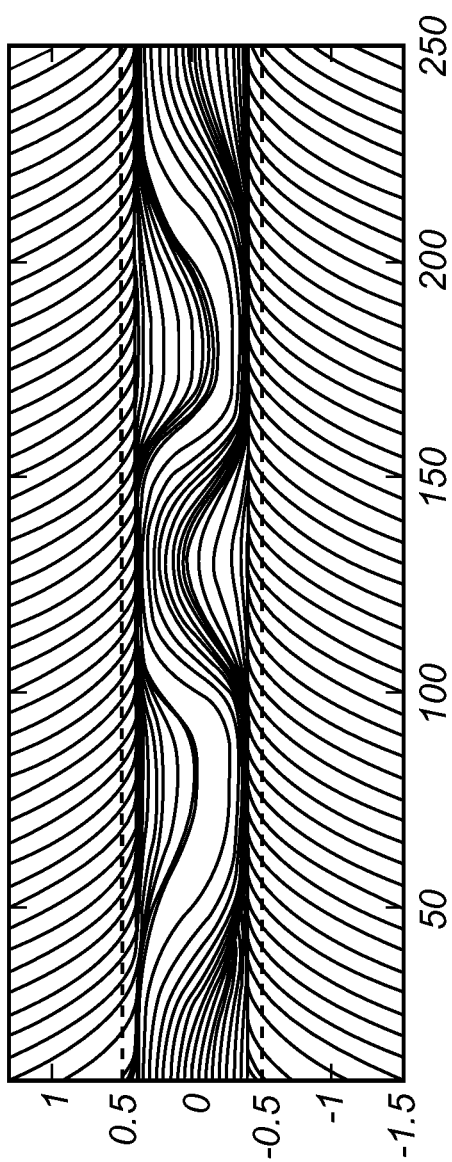
FIG. 18 is a plot in curvilinear coordinates of a flow field in the vicinity of a reference path.

An illustrative example is the flow around a reference path P defined by a curved section of road. FIG. 18 is a flow field plot in the vicinity of the reference path, in curvilinear (track) coordinates, wherein flow distortion is applied in order to reduce acceleration and jerk. The horizontal axis represents longitudinal distance x in meters, the vertical axis represents lateral distance γ in meters, and the two pipe boundaries are indicated by horizontal dashed lines. The corner apex is located at x=130. FIG. 17 is a zoomed portion from the full flow map of FIG. 18, but with realistic spatial geometry (cartesian coordinates). Here, the path and the pipe boundaries are drawn with dashed lines. The streamlines coming from outside the pipe tend to obscure the actual 'curve cutting' paths (reference-path cutting paths) within the pipe, and the relative narrowness of the pipe makes it hard to visualize the overall pattern. For completeness, therefore, FIG. 18 shows the overall flow field in curvilinear coordinates. It is noted that the vertical scale is highly expanded compared to the horizontal scale.

In further variations of the pipe-flow embodiments, the offline optimization can be added to minimize peak acceleration or jerk. Further, machine learning or artificial intelligence or other pattern-matching techniques can be utilized to learn optimal flow-distortion functions dependent on road geometry, making the method highly efficient for real-time use.

In still further variations, discrete switching between a global (external) flow definition and the (internal) optimized pipe flow can be employed. In this case, the tracking points may be brought into the center of the pipe before pipe-flow is enabled. Moreover, warnings or control interventions (e.g., autonomous braking) can be provided if any tracking point exits the pipe boundaries. A generally applicable strategy at this point may be to switch to a modified external flow field automatically if a tracking point exits the pipe boundary 1202, after which autonomous path corrections are applied to re-capture the tracking points in the pipe-flow.

The invention claimed is:

1. A method for controlling a heavy-duty vehicle to follow a reference path (P), the method comprising:
    obtaining the reference path (P) to be followed by the vehicle,
    determining a goal point (G) along the reference path (P) to be used as a steering reference from a vehicle location (x) in vicinity of the path (P), where the goal point (G) is distanced along the path (P) by a preview distance (Dp) measured from a reference location (x, $G_0$) associated with the vehicle location (x),
    determining, on the basis of the goal point (G), a direction $w_1$ of a first flow field associated with the reference path (P),
    determining whether a lateral deviation (y) of the vehicle location (x) from the reference path (P) exceeds a threshold lateral deviation ($y_{max}$), and
    controlling the vehicle in accordance with the direction $w_1$ of a first flow field if the lateral deviation (y) exceeds the threshold lateral deviation ($y_{max}$), and otherwise controlling the vehicle in accordance with the direction $w_{pipe}$ of a pipe flow substantially parallel to the reference path (P) or in accordance with an optimization-based path.

2. The method of claim 1, wherein the pipe flow is parallel to the reference path (P) in at least a first segment of the reference path (P).

3. The method of claim 1, wherein the first flow field is a continuous function with respect to the lateral deviation (y) and its direction $w_1$ is oriented parallel to the reference path (P) at or near the threshold lateral deviation ($y_{max}$).

4. The method of claim 2, wherein the pipe flow has a nonzero centripetal component in at least a second segment of the reference path (P), wherein the second segment corresponds to where the reference path's curvature ($\kappa$) exceeds a threshold curvature.

5. The method of claim 1, wherein the optimization-based path is determined using a cost function that penalizes acceleration above a threshold acceleration.

6. The method of claim 1, wherein the optimization-based path is determined by minimizing total travel time.

7. The method of claim 1, wherein the optimization-based path is determined by minimizing a norm of a second derivative of the path's curvature.

8. The method of claim 1, wherein the optimization-based path is determined by fitting a low-degree polynomial to the reference path (P).

9. The method of claim 1, wherein the optimization-based path is determined subject to a constraint of not exceeding the threshold lateral deviation ($y_{max}$).

10. The method of claim 1, wherein the optimization-based path is determined by optimizing a cost function over possible paths extending up to a nonzero forward horizon ($D_{opt}$).

11. The method of claim 1, wherein the direction $w_1$ of the first flow field is determined as $$w_1 = t_3 + \frac{t_1 - t_2}{2\cos\theta}$$

where $t_1$ is a unit-length tangent vector to the reference path (P) evaluated at the reference location ($G_0$), $t_2$ is a unit-length tangent vector to the reference path (P) evaluated at the goal point (G), $t_3$ is a unit-length vector directed from the vehicle location (x) towards the goal point (G), and angle $\theta$ is half the angle between the two tangent vectors $t_1$ and $t_2$.

12. The method of claim 1, wherein the preview distance ($D_p$) is variable.

13. The method of claim 12, wherein the preview distance ($D_p$) increases with an increasing lateral deviation (y) from the reference path (P), and decreases with a decreasing lateral deviation (y).

14. The method of claim 1, wherein the reference location (x) equals the vehicle location.

15. The method of claim 1, wherein the reference location ($G_0$) is a location on the path (P) intersected by a straight line orthogonal to the path (P) at the reference location ($G_0$) through the vehicle location (x).

16. The method of claim 1, wherein controlling the vehicle comprises performing a Lane Keep Assistance function, a semi-autonomous drive application, or an autonomous drive application.

17. A control unit for controlling a heavy-duty vehicle to follow a reference path (P), the control unit comprising processing circuitry configured to perform the method claim 1.

18. A heavy-duty vehicle comprising the control unit of claim 17.

* * * * *